United States Patent
Nagasaka et al.

[11] Patent Number: 5,818,439
[45] Date of Patent: Oct. 6, 1998

[54] VIDEO VIEWING ASSISTING METHOD AND A VIDEO PLAYBACK SYSTEM THEREFOR

[75] Inventors: Akio Nagasaka; Hirotada Ueda, both of Kokubunji; Takafumi Miyatake, Hachioji, all of Japan

[73] Assignee: Hitachi, Ltd., Tokyo, Japan

[21] Appl. No.: 601,363

[22] Filed: Feb. 16, 1996

[51] Int. Cl.[6] ...................................................... H04N 7/16
[52] U.S. Cl. .............................. 345/327; 348/12; 348/7; 455/4.2
[58] Field of Search ............................ 348/6, 7, 10, 12, 348/13; 395/200.47–200.49; 455/3.1, 3.2, 3.3, 4.1, 4.2, 5.1, 6.1, 6.2; 345/327; H04N 7/14, 7/16, 7/173

[56] References Cited

U.S. PATENT DOCUMENTS 5,606,359  2/1997  Youden et al. .............................. 348/7
5,721,829  2/1998  Dunn et al. .............................. 348/7 X

FOREIGN PATENT DOCUMENTS 3-35431  2/1991  Japan .
7-192003 7/1995 Japan .

OTHER PUBLICATIONS

"Automatic Video Indexing and Full–Video Search for Object Appearance" Akio Nagasaka, et al, pp. 119–133 (1991).

Primary Examiner—Nathan J. Flynn
Attorney, Agent, or Firm—Antonelli, Terry, Stout & Kraus, LLP

[57] ABSTRACT

In order to provided information for helping a viewing user remember the contents of past viewing of a video program, in an easy-to-comprehend form and in as small an information amount as possible, a video terminal device capable of controlling video playback by a controller stores a position of the video program at which it was interrupted by the user. The interrupted position is stored in a video library of a video server. Images representative of a portion from the start or another position of the interrupted video program up to the interrupted position are extracted by a video digest making program. The extracted representative images are represented by a list display based on reduced icons or a digest image. The list or the digest image is displayed before resuming the interrupted video program.

25 Claims, 15 Drawing Sheets

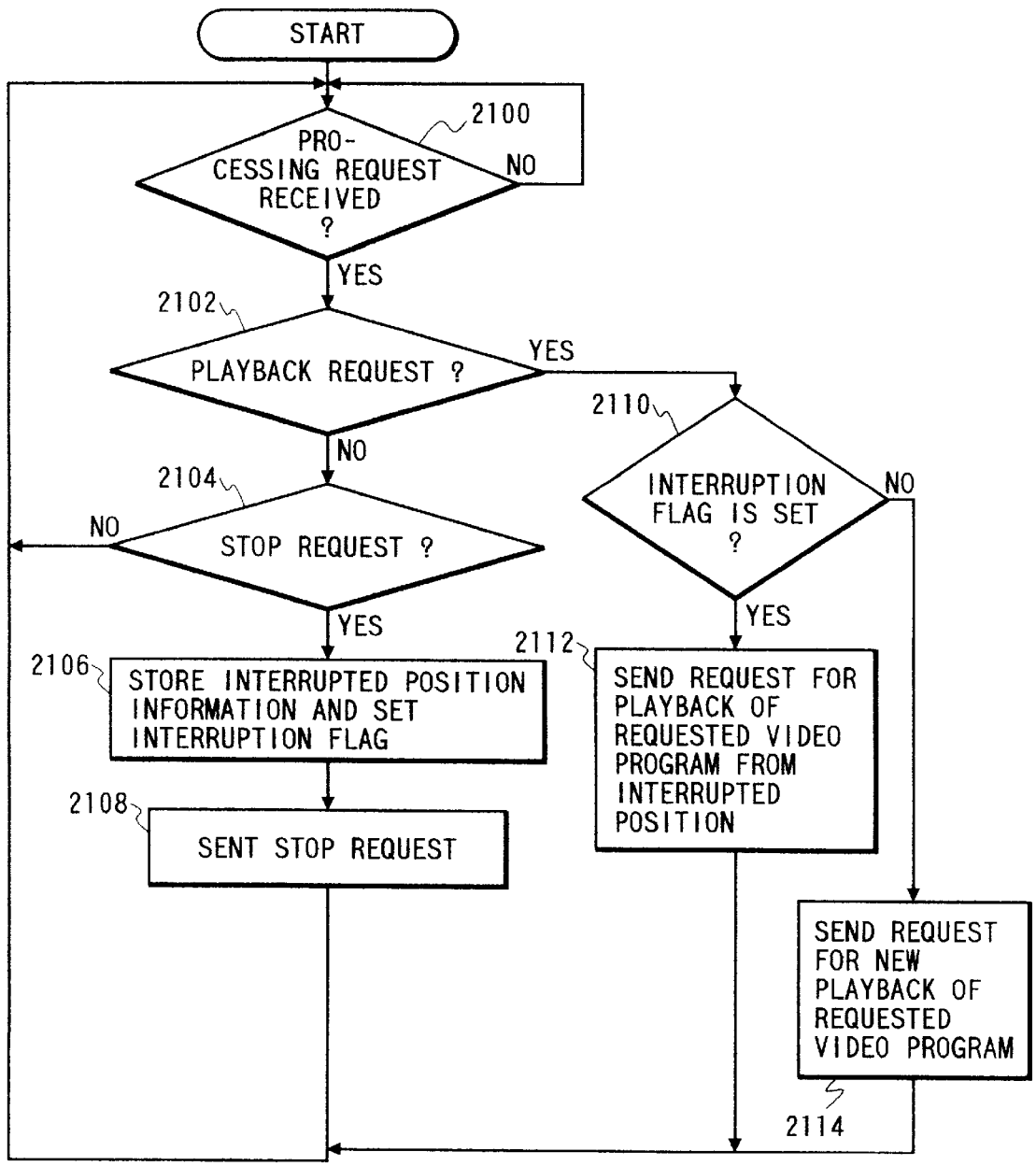

VIDEO VIEWING ASSISTING METHOD AND A VIDEO PLAYBACK SYSTEM THEREFOR

BACKGROUND OF THE INVENTION

The present invention relates to an apparatus for viewing video images such as movies and television programs and a method of assisting viewing videos for using that apparatus and, more particularly, to a computer-controlled video playback system such as a video-on-demand system.

Recent popularization of home video units and rental video cassettes has been increasing the chance of viewing a variety of videos at home. Unlike the viewing at outside facilities such as movie theaters, users can view videos in any manner they like, interrupting a program and resuming for example as desired. If, however, the duration of an interruption gets long, the viewer's memory of the already viewed portion of an interrupted program becomes ambiguous and therefore the viewer may not always follow the contents of the rest of the resumed program. Conventionally, the viewer rewinds the video to view it from its beginning all over again or looks at the already viewed portion in a skipped manner to remember the contents of the viewed portion.

However, such operations for remember the contents of the already viewed portion of a video program are troublesome and time-consuming for viewers. Further, in the case of such video programs provided over a network as video on demand, the already viewed portion must be re-transmitted, thereby making the viewing costly.

Japanese Patent Laid-Open No. 3-35431 discloses a video disc player in which playback screens are intermittently outputted from the recording start position of a recording disc by means of fast forward feed operation before resuming playback. This conventional technique displays playback screens by sequentially repeating fast forward feed and normal playback at predetermined intervals starting from the recording start position. If, a program has been viewed up to a position in the last half of a program and interrupted there by the viewer, resumption of viewing requires to go back to a digest display position and therefore takes unbearably long time. In addition, fast forward feed and normal playback repeat at predetermined intervals of time regardless of the contents of the already viewed portion, not always displaying scenes that help the viewer to remember the contents.

SUMMARY OF THE INVENTION

It is therefore an object of the present invention to provide a video viewing assisting method and a video playback system therefor that provide information for helping a viewing user remember the contents of past viewing, in an easy-to-comprehend form and in as small an information amount as possible.

The video playback system according to the present invention comprises video playback means for controlling video playback operation, storage means for storing a video position at which the user interrupted viewing, and digest information making means for extracting, from the storage means, images partially representative of a video from its start or a particular position up to a position at which viewing of the video has been interrupted by the user in order to dynamically generate digest information about the representative images as a video digest for displaying the representative images in a list form through a reduced icon or for displaying them continuously. In this novel system, the digest information is given to the video playback means at resuming the interrupted viewing.

In the above-mentioned video playback system, means is further provided for resuming the video from the interrupted position continuously when the video digest is given to the video playback means. Along with this resuming means, another resuming means is also provided which resumes the video from a position a certain period prior to the interrupted position. In addition, monitoring means is provided for checking whether the icon in the list has been specified by a pointing device and playback means for reproducing the video starting from a scene corresponding to the designated icon. Further, extracting means is provided for detecting, when extracting the representative portions of the video, a change point between cuts of video to extract an image at that change point or a video image in the vicinity of the change point. Still further, determining means is provided for determining whether a single cut contains an image largely different from the above-mentioned video image and the other images in that cut. If such an image has been determined contained, the image is also extracted to be one of the representative potions of the video. Alternately, extracting means is provided for extracting images at certain intervals starting from the start of a cut to use the extracted images as the representative images. Determining means is also provided for determining the degree of significance of images to rank them. Images over a certain rank are used in generating the digest. Weighing means is provided for weighting, in determining the degree of significance, the representative images according to their temporal interval from the viewing interrupted position. Adjusting means is also provided for adjusting the rank of images to be extracted such that a total time of the digest becomes a particular time. Lastly, display means is provided for providing, when displaying the representative images in a list, a visual feature such that a representative image of relatively higher rank can be distinguished from a representative image of relatively lower rank.

The term "representative image" used herein denotes images extracted one by one from each of the shots of the video. The term "shot" used herein denotes a continuous image interval taken by a single camera. The shot is the smallest unit of video that can be regarded as one block in terms of image and content.

According to the present invention, information is provided for helping a user comprehend the contents of a portion of video of which viewing has been interrupted by the user, thereby allowing the user to quickly remember the contents of the past viewing. This saves the user of a trouble of viewing the already viewed portion all over again. In addition, since the video is resumed continuously from the interrupted position after the video digest is given, the user can continue to view the video without a sense of discontinuation in the flow of the video. In resuming, the video is reproduced starting from a certain period prior to the interrupted position, so that the user can have continuous viewing without being confused at a sudden emergence of a new image. Further, the reproducing means for reproducing the video starting from a scene corresponding to the designated icon allows the user to review the video not only from the interrupted position but also from any other desired position. Further still, as for the extraction of representative images, the extracting means for automatically extracting the image at the change point between shots is provided, the user need not make the registration of representative images. If, at the extraction, a change occurs at the picture-taking angle at the change point between shots due to panning or zooming, the effected image is also extracted, thereby extracting all scenes of interest. This capability enhances the utility value of the list of representative images or the video digest. Ranking the representative images to extract only images of relatively higher significance facilitates the selection of only the most effective representative images from among too many images in the list. At resuming of viewing, images near the interrupted position contain more information about the contents to be viewed, so that highly ranking such images increases the chance of their being included in the digest information as compared with other images. Moreover, setting the video digest such that it falls within a particular time allows the user to obtain the digest quickly and briefly. Lastly, distinguishing the representative images of relatively higher rank from those of relatively lower rank in displaying the representative image list allows the user to comprehend the scheme and details of contents of the video at a glance.

Still further advantages of the present invention will become apparent to those of ordinary skill in the art upon reading and understanding the following detailed description of the preferred and alternate embodiments.

BRIEF DESCRIPTION OF THE DRAWINGS

The invention will be described in conjugation with certain drawings which are for the purpose of illustrating the preferred and alternate embodiments of the invention only, and not for the purpose of limiting the same, and wherein:

FIG. 5 is a flowchart indicating the processing by a control processing program of FIG. 3;

DETAILED DESCRIPTION OF THE PREFERRED AND ALTERNATE EMBODIMENTS

This invention will be described in further detail by way of one preferred embodiment of the invention with reference to the accompanying drawings.

Figure 1:
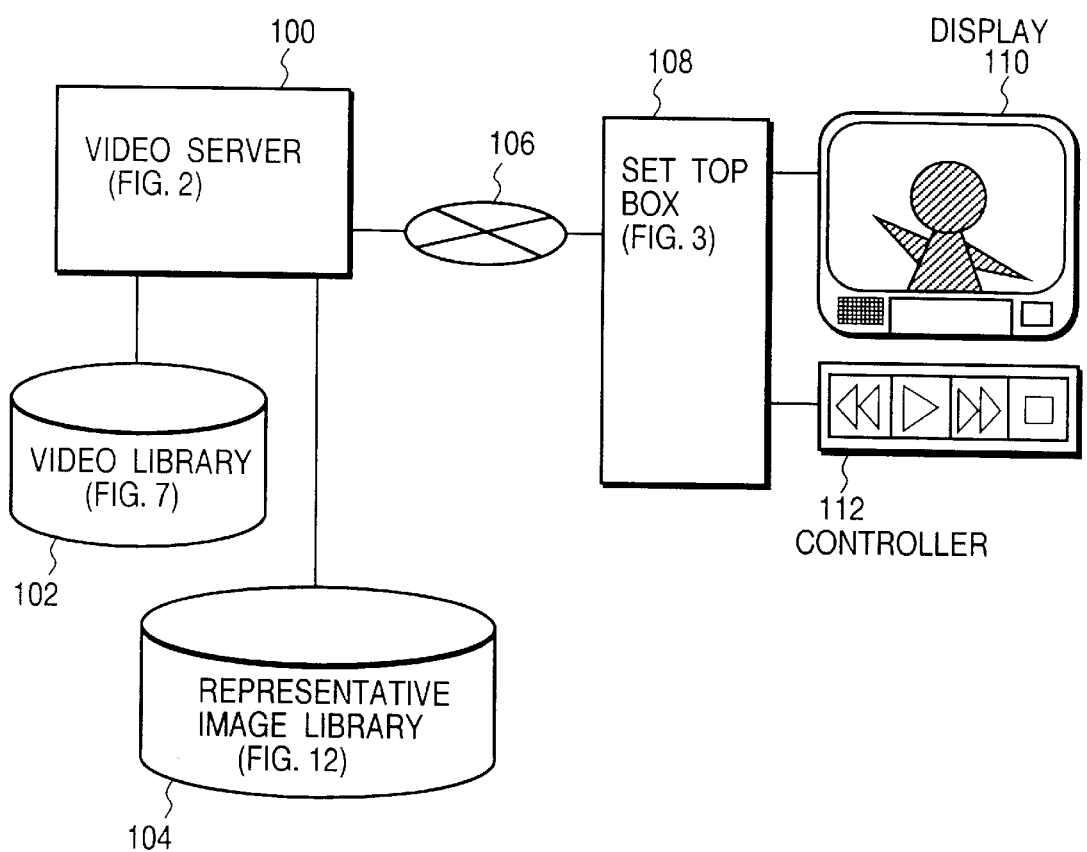
FIG. 1 is a schematic diagram illustrating a video-on-demand system practiced as one preferred embodiment of the invention.

Referring to FIG. 1, a video-on-demand system practiced as one preferred embodiment of the invention will be outlined to clarify the entire concept of the present invention, followed by the details of thereof.

Now, referring to FIG. 1 again, there is shown a schematic diagram illustrating the video-on-demand system in its entirety practiced as one preferred embodiment of the invention. This system is largely composed of a video server 100 and a set top box 108. The video server 100 provides video service, while the set top box 108 receives it. Transfer of data and signals between the server and the terminal is performed via a communication network 106 such as ISDN (Integrated Services Digital Network). The video server 100 is connected with two types of auxiliary storage devices. One is for storing data of video programs themselves to be provided to the user, namely a video library 102. The other is for selectively storing only scenes of interest (hereinafter referred to as representative images) from the video programs, namely a representative image library 104. A procedure for extracting representative images will be described later with reference to FIGS. 8 and 11. The set top box 108 is connected with a display 110 for displaying the programs and a variety of information associated with them and a controller 112 for instructing selection, playback, and stop of the programs.

The user wanting to watch one of the programs sends to the set top box 108 a command from the controller 112 via the communication network 106, indicating the set top box 108 which program is to be watched. Receiving the command, the video server 100 searches the video library 102 for the requested program to send the video data thereof to the set top box 108 via the communication network 106. The set top box 108 receives the video data and displays them on the display 110. Thus, the user can watch any desired program stored in the video library. Normally, the video data are transmitted from the video server to the set top box from the start of the program up to its end without interruption. If the user wants to interrupt viewing and instructs interruption by the controller 112, an interruption command is sent to the video server 100 to stop the transmission of the video data. When this happens, the set top box 108 stores an identifier (ID) of a video displayed at the time of interruption and address information about an interrupted position. Then, when playback of a program is indicated by the controller 112, the set top box 108 checks the stored data for any interrupted program and sends a result to the video server 100. If a program to be playbacked has been found a new program, the video data of the program are sent from the video server starting with the beginning of the program. If the program to be playbacked has been found one that was interrupted during viewing, the video server 100 generates and transmits a digest up to the interrupted position of the program to the set to box 108, followed by the transmission of the video data starting from the interrupted position. The set top box 108 displays the received digest and then the program starting from the interrupted position.

Figure 2:
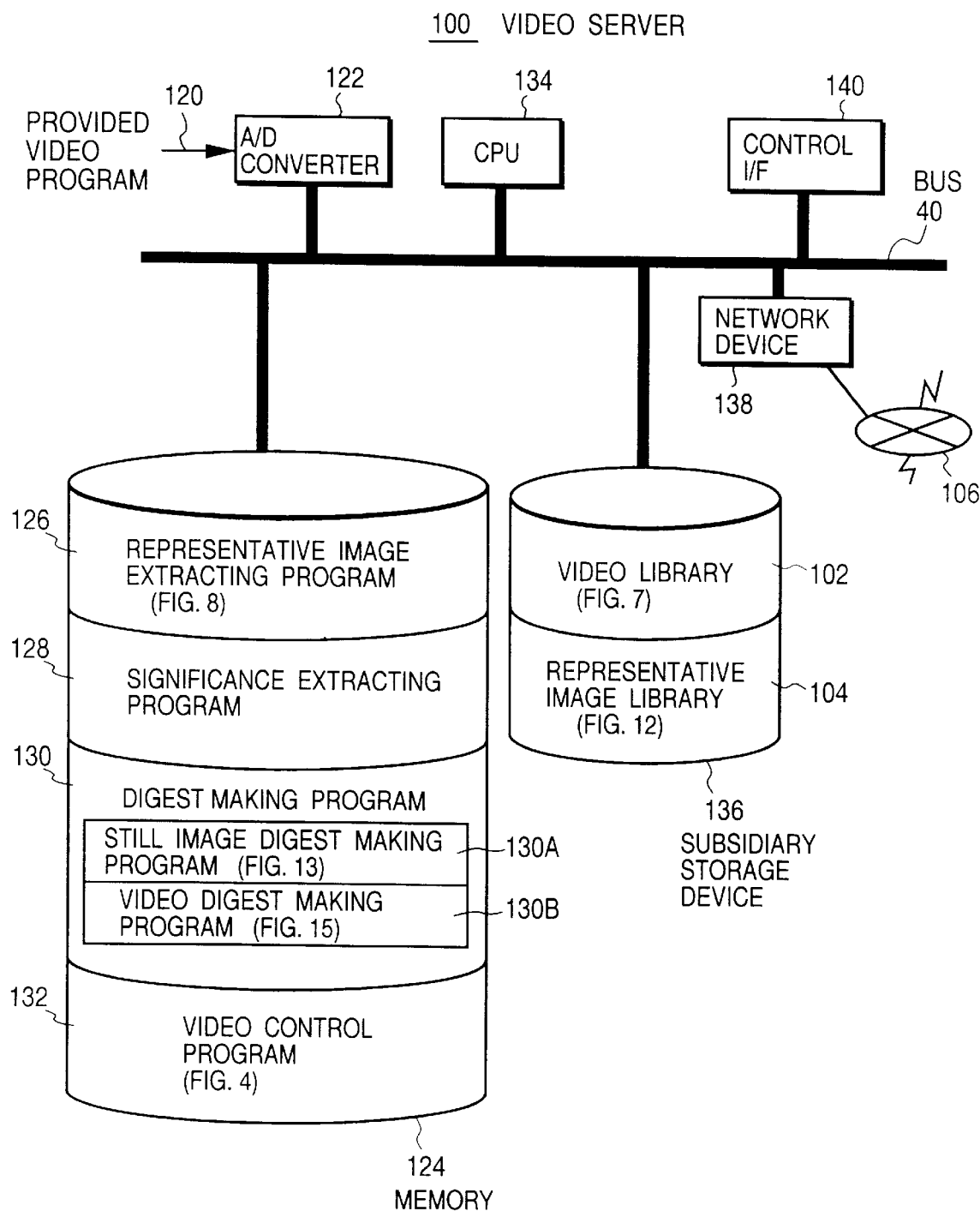
FIG. 2 is a schematic diagram illustrating a video server as used in the embodiment of FIG. 1.

FIG. 2 shows an example of the constitution of the video server 100. A CPU (Central Processing Unit) 134, connected to other devices in the video server 100 via a bus 40, executes programs for implementing a variety of capabilities to be described. A memory 124 stores programs and data necessary for executing them. As required, a variety of necessary information can be stored in a subsidiary storage device 136. A network device 138 transfers data with the set top box 108, not shown in FIG. 2, via the communication network 106. A control interface (I/F) 140 controls the transfer of data between a display device such as a CRT, not shown, or an input/output device such as a keyboard or a pointing device, not shown, and the video server 100. Many externally provided programs are based on analog video. An analog video image 120 is converted by an A/D converter 122 to digital image data to be supplied to the memory 136.

For example, the memory 136 is an image storage device formed by a recording medium such as an optical disc or a magnetic disc. The digital image data are stored in this memory in a file format such as a video data structure 600 to be described later with reference to FIG. 7.

The video server 100 provides two major capabilities. One captures a provided video program to store it in the video library 102. The other accepts a request from the set top box 108 to send requested data to it.

To store the captured program in the video library 102, a representative image extracting program 126 and a significance extracting program 128 are stored in the memory 124. The video image outputted from the A/D converter is stored as digital image data into the video library 102 in the subsidiary storage device 136. At the same time, representative images are extracted from this video image by the representative image extracting program 126. The extracted representative images are ranked in significance by the significance extracting program 128. The representative images and their ranks are stored in pairs into the representative image library 104. Each representative image is stored in a form of a representative image structure 80 to be described with reference to FIG. 12.

Meanwhile, to send video data on demand from the set top box 108, a digest making program 130 and a video control program 132 are prepared. The digest making program 130 is executed when resuming an interrupted program. Namely, the program 130 selects only scenes of significance associated with an range of the video up to the interrupted position from among the scenes of significance of the program stored in the representative video library 104. The program 130 then makes a digest of the selected scenes to send it to the set top box 108 before the re-transmission of the requested video. The program 132 interprets the request data coming from the set top box 108 and received by the network device 138. Based on the result of the interpretation, the program 132 searches the video library 102 for the video data of the requested program and sends the found video data to the set top box 108.

Figure 4:
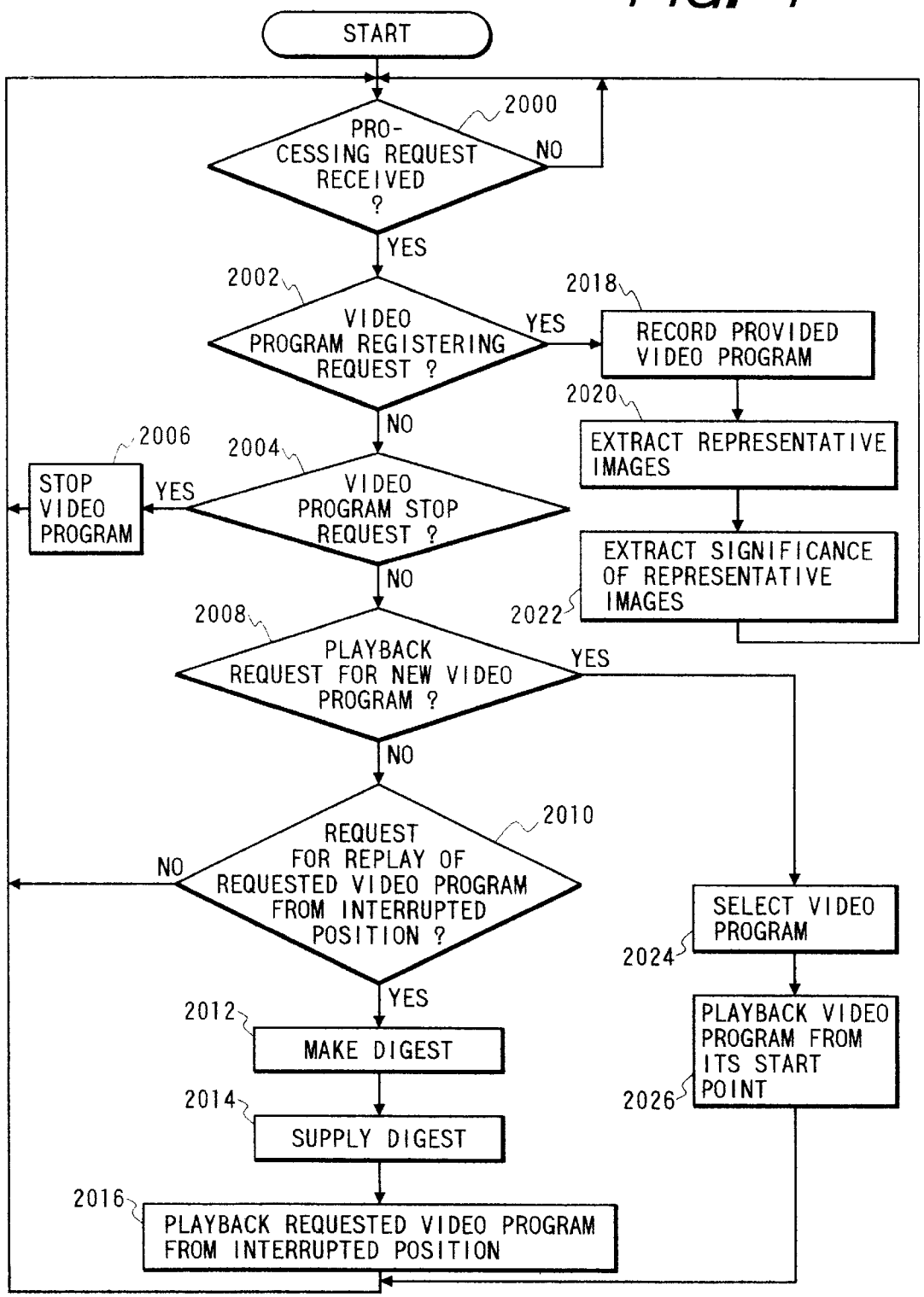
FIG. 4 is a flowchart indicating the processing by a video control program of FIG. 2.

FIG. 4 shows an example of the flowchart indicating the processing by the video control program 132. In step 2000, whether a processing request has been made or not is checked. Standby state continues until the processing request comes. If the processing request is for registration of a program (step 2002), the corresponding video image is registered in the video library (step 2018) and, at the same time, preprocessing for making the digest is performed by the representative image extracting program 126 and the significance extracting program 128 (steps 2020 through 2022). Then, the processing by the video control program 132 goes back to step 2000. If the processing request is for stopping the playback of video (step 2004), the transmission of the video data is stopped (step 2006) and the processing goes back to step 2000. If the processing request is for viewing a new video, an interface program for selecting a corresponding program is executed (step 2024). For example, a program title list widely used in VOD systems is displayed, from which a desired program is selected by use of the controller 112. When the desired program is selected, its video data are transmitted starting from its head (step 2026). If, in step 2008, the processing request is for resumption of viewing a program that the user viewed halfway, and if the request is for resuming the viewing starting from the interrupted position, the digest is made by the digest making program 130 to be sent to the set top box for display (step 2014), followed by the transmission of the video data starting from the interrupted position (step 2016). If the user makes no instruction after the digest has been displayed, the digest is automatically replaced with the video data. If the user instructs switching to the video data while the digest is being displayed, the video data is displayed ignoring a digest display time set by the system.

Figure 7:
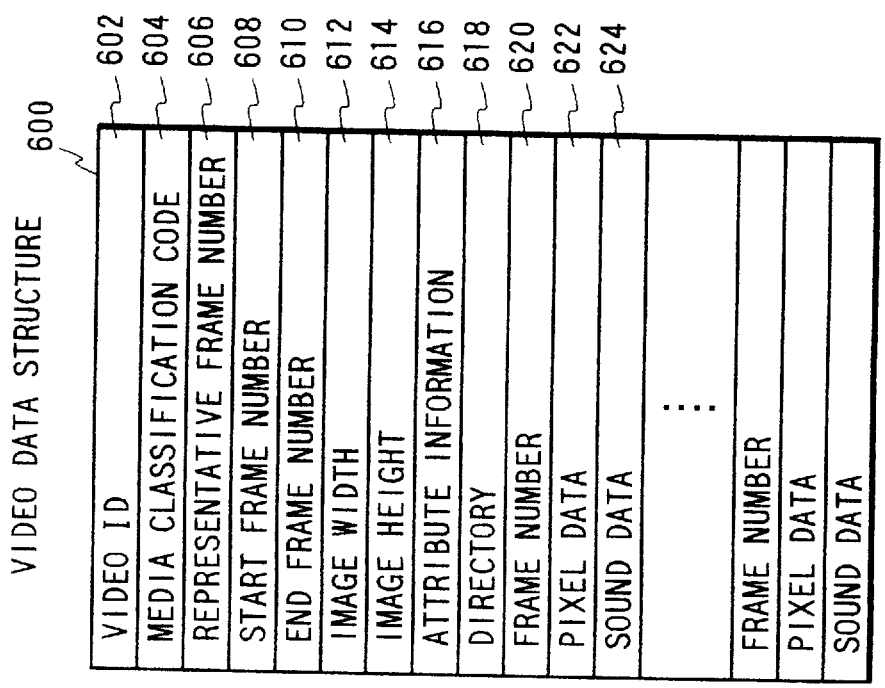
FIG. 7 is an example of the structure of a file for storing an image in a digital manner.

FIG. 7 shows an example of a simplified file format in which the digital video is stored in the video library 102 in the video server 100. This file format is indicated as the video data structure 600. In the format of the video data structure 600, the video library 102 stores digital images of a variety of types as files. Receiving a control signal for requesting the distribution of video from the set top box 108, the video server 100 accesses files of the format of the video data structure 600 to distribute the requested video to the set top box 108.

Reference numeral 602 indicates an ID number for uniquely identifying each video. Reference numeral 604 indicates a classification code for identifying whether the video is based on an optical video disc, a video tape, or an external storage device. When the video is playbacked by controlling the optical video disc or the like, the system does not have the digital data of frame images. When the external storage device is controlled for playback, recording media must be exchanged for each video, thereby taking time in accessing the media, but at a merit of relatively low medium unit price. Consequently, frequently used images are stored digitally, while other images are stored in external storage devices, thereby lowering the total cost of the system.

Reference numeral 606 indicates a number of a frame representative of the image (hereinafter image a) identified by the image ID 602. For example, when selecting one of images of a lot of types, the images of this representative frame are displayed in a list form for ease of selection by the user. Reference numeral 608 indicates a start point of the image a in the storage medium, namely a start frame number. Reference numeral 610 indicates an end point frame number, namely an end frame number. Reference number 616 indicates attribute information that contains attributes of the image α. For example, the attributes include a date of creation of the image α, ownership of its copyright, and a field of the image such as news, cinema, and music.

The other information in the video data structure 600 is necessary when the video data are digital data. Reference numeral 612 indicates an image width and reference numeral 614 indicates an image height. Reference numeral 618 indicates a directory for holding information indicating at which address of the video the frame image data corresponding to a certain frame number exists. Reference numeral 620 indicates a frame number, reference numeral 622 indicates frame pixel data, and reference numeral 624 indicates sound data. These three pieces of information are repeatedly specified by the number of frames given.

Figure 3:
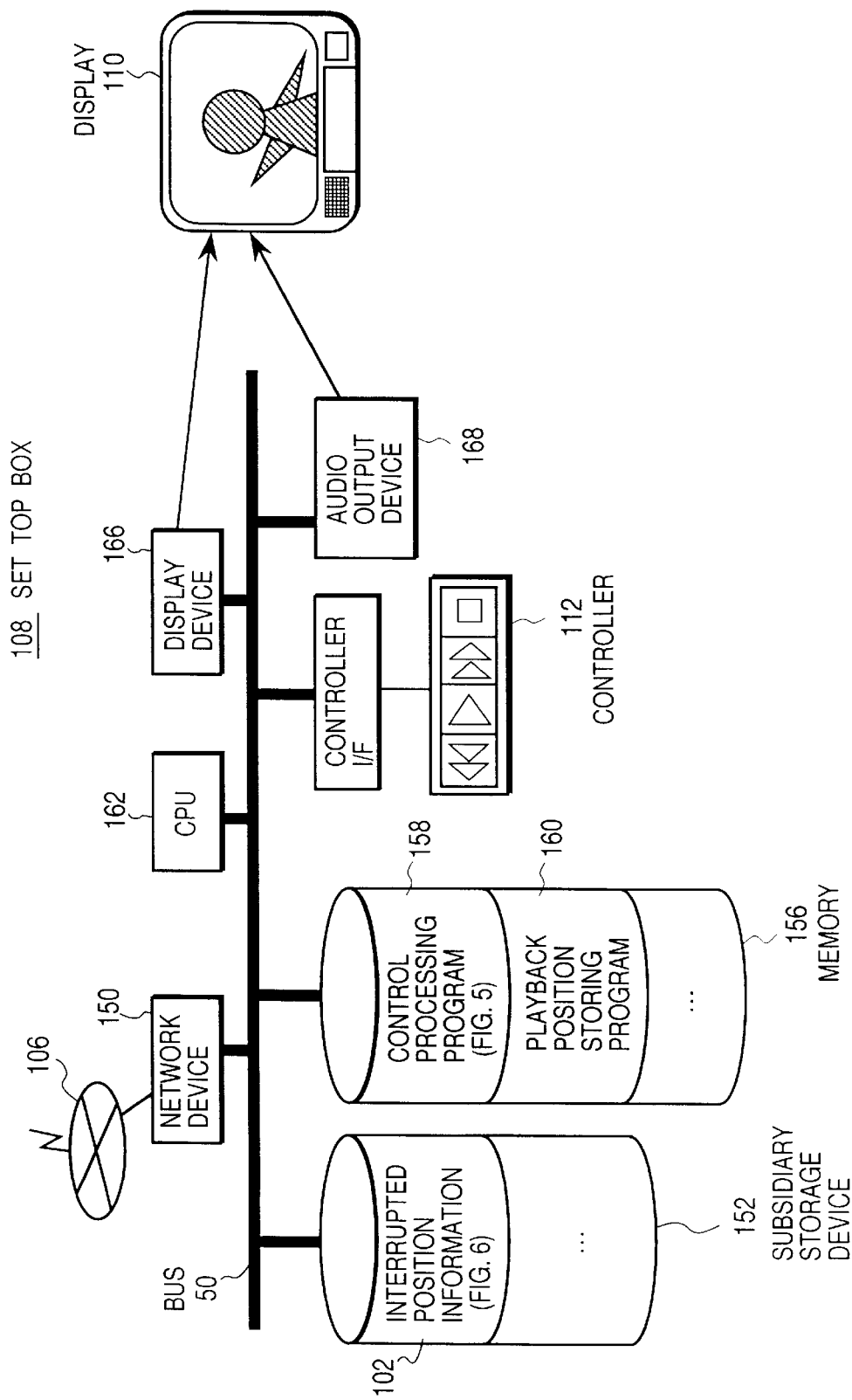
FIG. 3 is a schematic diagram illustrating a set top box as used in the embodiment of FIG. 1.

FIG. 3 is a schematic diagram of the set top box 108. A CPU 162, connected to other devices in the set top box via a bus 50, executes programs for implementing a variety of capabilities to be described later. A memory 156 stores the programs and data necessary for executing them. As required, a variety of information can be stored in a subsidiary storage device 152. A network device 150 transfers data with the set top box via the communication network 106. A display device 166 is an interface device that transforms image data of video data received from the video server 100 into a form that the user can see as a picture and displays the resultant picture on the display 110. A controller I/F 164 is an interface device that transmits to the CPU 162 the state of the controller 112 such as a keyboard or a pointing device from which user instructions are given. An audio output device 168 transforms sound data of the video data received from the video server 100 into an analog form that can be heard by the user.

A memory 156 stores a control processing program 158 and a playback position storing program 160. The control processing program 158 interprets a user instruction entered from the controller 112 to send a command to the video server 100 as required.

Figure 6:
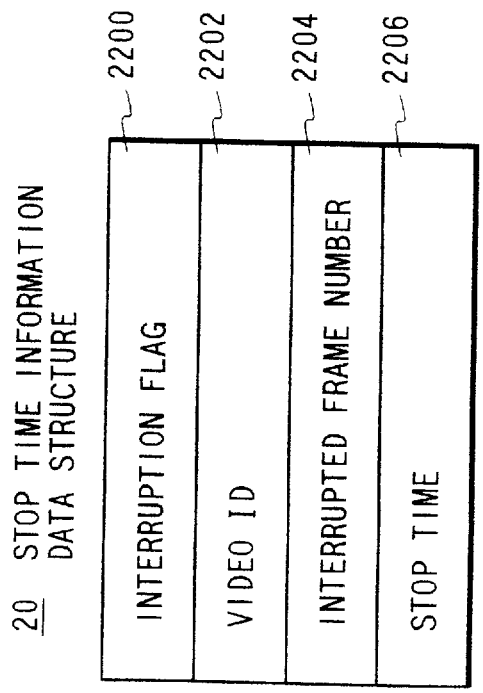
FIG. 6 is a diagram illustrating a structure containing information given when viewing is interrupted.

If the viewing of a program has been interrupted, the playback position storing program 160 stores interrupted position information 154 into the subsidiary storage device 152. This information is formed by a stop time information data structure as shown in FIG. 6. Referring to FIG. 6, reference numeral 2200 indicates a flag for indicating that the viewing has been interrupted. When this interruption flag is on, it indicates that information 2202 through 2206 are valid. Reference numeral 2202 indicates an ID number of the video. This ID number indicates a video program of which viewing has been interrupted. A frame number 2204 provides address information that indicates the interrupted position in an entire video program. A stop time 2206 indicates a date and time at which the viewing was interrupted. The stop time is used to perform processing in which, if an interrupted duration, namely a time from the stop time 2206 to a resumption request, is relatively short, no digest is displayed.

FIG. 5 shows an example of the flowchart indicating the processing by the control processing program 158. In step 2100, the program 158 checks if there is a processing request and, if no request is found, gets in the standby state until one comes. If the processing request has been found and it is the request for video program viewing (step 2102), the program 158 reads the interrupted position information 154 to check whether the interruption flag is on for the requested video program (step 2110). If the interruption flag has been found on, the control processing program 158 requests the video server 100 for playback of the program starting from the interrupted position (step 2112). If the flag is off for the program, the control processing program 158 sends a request for newly viewing the requested program to the video server 100 (step 2114). On the other hand, if the processing request is for stopping the viewing of a program (step 2104), the control processing program 158 turns on the interruption flag 2200 for that video program and stores the interrupted position information 156. Then, the control processing program 158 sends a stop request to the video server 100 (step 2108) and goes back to step 2100.

In what follows, examples of the procedures in which individual components implementing the present invention are executed will be described in detail, in the order of the representative image extracting program 126, the significance extracting program 128, the digest making program 130, and the video control program 132. The descriptions of the other components are omitted because they are self-evident from the above outline descriptions.

The representative image extracting program 126 extracts portions representative of a newly entered video. The following describes a method of dividing a whole video into shots to make the start image of each shot a representative image. This method is realized by adding the processing capabilities implementing the present invention to a conventional method of automatically detecting the change between shots. Available for the conventional method is shown in A. Nagasaka and Y. Tanaka "Automatic Video Indexing and Full-Video Search for Object Appearances," Proc. of IFIP WG 2.6 2nd Working Conference on Visual Database Systems, pp. 119–123, Budapest, Hungary, Sep. 30–Oct. 3, 1991. The change between shots is basically detected by capturing the entered video into each frame computing device and obtaining the similarity in image feature between the current frame and the immediately preceding frame to determine whether a shot change is taking place now. In the two frames having the shot change in between, the images are greatly different from each other, so that the similarity in image feature lowers. Conversely, in a single shot, the similarity gets relatively large. In the present embodiment, a color histogram is used as the image feature. For an alternative approach of automatically detecting the shot change, a method may be used in which the similarity in image feature between the current frame and the immediately preceding frame and the similarity between the immediately preceding frame the frame still immediately preceding frame are obtained to determine that the shot change is detected when both similarities fall outside their respective allowable ranges.

The representative images and other accompanying processing results (for example, rank of significance) are stored in the subsidiary storage device 136 as required.

Figure 8:
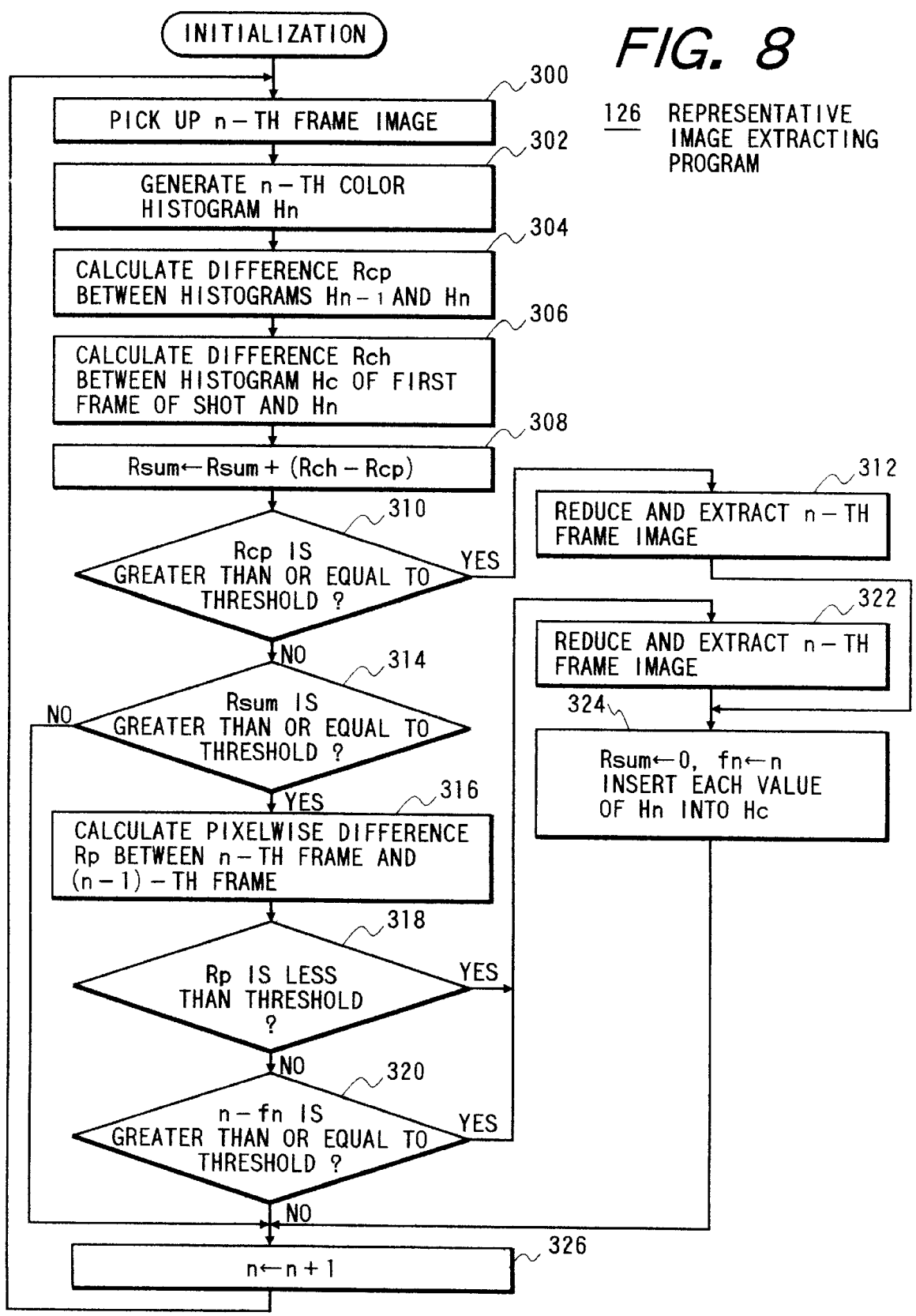
FIG. 8 is a flowchart indicating an algorithm for extracting a representative image.

FIG. 8 shows a flowchart indicating the processing by the representative image extracting program 126 to be executed by the CPU 134. Before a new video is entered, initialization is performed in which the color histogram is reset and a variety of variables are set to their initial values. Then, an image of a frame indicated by frame number n is entered (step 300). The initial value of n is the number of the start frame of the new video. Then, the color histogram Hn is generated for the entered frame image (step 302). The color histogram is generated by obtaining the frequency of occurrence of pixels that indicate a same color. For example, to generate the color histogram of 64 colors (two bits for each of R, G, and B), the pixels in the frame is reduced to 64 colors and the number of pixels that represent each of the 64 colors is counted. Then, the degree of difference Rcp between the Hn and the color histogram Hn-1 of the immediately preceding frame is obtained (step 304). The Rcp itself is obtained by chi-square test or the like. At the same time, the degree of difference Rich between the histogram Hc of the start frame of the shot and the Hn is also obtained (step 306). The difference between Rch and Rcp is added to Rsum (step 308).

Then, the Rcp is compared with a preset threshold value th1 (step 310). If the Rcp is greater than or equal to the th1, it is determined that there is a shot change between the nth and n-1th frames. Then, the n-th frame image is reduced for extraction and the reduced image is stored as a representative image (step 312). If the Rcp is smaller than the th1, the Rsum is compared with another preset threshold value th2 (step 314). If the Rsum is smaller than the th2, one is added to n in step 326 to go back to step 300 to repeat the above-mentioned processing. If the Rsum is greater than or equal to the th2, it is regarded that the difference between the image of the nth frame and the start image of the shot has become sufficiently large. To extract the image of the nth frame as a representative image, the processing indicated in steps 316 through 320 to be described is performed. Generally, in a video interval in which there is no image change between frames, the degree of difference in image Rch-Rcp between the start frame of the shot and the current frame always presents a value near zero. The Rsum obtained by accumulating this degree of difference also presents a value near zero. However, in a video interval having a movement, the degree of difference gets larger as an interval between frames to be compared gets larger, resulting in Rch>Rcp. If this happens, the accumulated value Rsum of Rch-Rcp also presents a relatively large value. The reason why the determination by using the accumulated value is used is to prevent too much extraction of representative images caused by a sudden noise or the like. For example, if a flash is generated from a camera, the Rch takes a very large value during the flash but returns to a small value as soon as the flash is over, making the accumulated value of the entire video interval increase not too large. Thus, the number of representative images to be extracted is prevented from getting too large to impair the utility of the list of representative images as a digest. The processing of steps 316 through 320 is provided to achieve the same purpose.

If a camera motion takes long in one shot, Rsum sometimes exceeds th2 during the motion. The frame image at that moment greatly differs from the start image of the shot; in this sense, that frame image may be used as a representative image. However, in terms of the significance of representative image, there is a difference between an image portion taken with a camera fixed and another image portion taken during the change of picture taking angles. Hence, to selectively extract an image of relatively greater significance, the extraction is not made soon after Rsum exceeds th2. Rather, the extraction is made after the following three conditions have been satisfied: (1) the camera stopped moving; (2) more than a certain time has passed; and (3) a next shot change has taken place. Determination of the condition (1) is made by using a total sum Rp of color difference on a pixel basis between the currently processed frame n and the immediately preceding frame n-1. The pixel-by-pixel color difference is obtained as a sum of luminance differences for R, G, and B for pairs of colors of pixels at the same coordinates of the two frames. The total sum Rp sensitively responds to motions to present a relatively great value. This total sum Rp is stored for the past about 10 pairs. From among the stored values of about 10 pairs, lower about five values are summed. If the resultant sum is smaller than a threshold value th3, it is determined that the camera has not moved (steps 316 through 318). As for the condition (2), if the camera has been moving for a long time, it is regarded that the camera motion is intentional. Therefore, if the camera is still moving after a certain time has passed from the start of a shot, the image at that moment is extracted as a representative image (step 320). As for the condition (3), if the next shot change has occurred, the frame immediately before that shot change is extracted as a representative image. Apparently, the frame immediately after that shot change is also extracted for a representative image.

Figure 11:
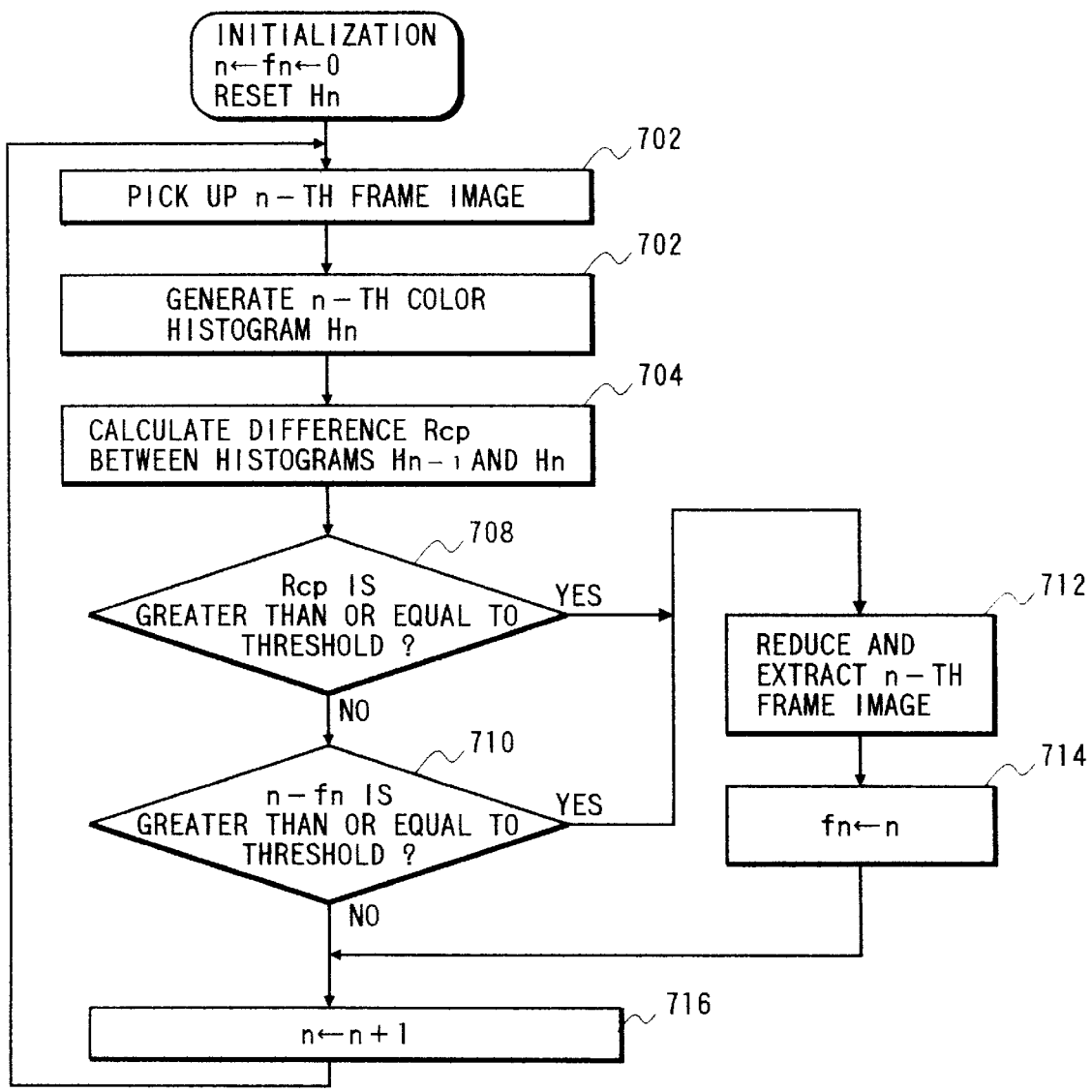
FIG. 11 is a flowchart indicating another algorithm for extracting a representative image.

Next, another processing program 126' for representative image extraction will be described. In the processing by this program, by extracting a representative image at certain intervals starting from a shot change, an image taken when a camera change such as panning or zooming has been made is also extracted as a representative image. Apparently, when no camera change occurs, almost the same images are extracted continuously. In this case, however, image recognition is not required, simplifying the processing. FIG. 11 shows a flowchart of the processing by the representative image extracting program 126'. In step 700, initialization is performed. In steps 702 through 706, the degree of difference between the immediately preceding frame and the current frame is obtained as in steps 302 through 304 of FIG. 8. Rcp is compared with a preset threshold value th1. If Rcp is greater than or equal to th1, then it is determined that a shot change has occurred and the nth frame image is reduced for extraction. The reduced image is stored as a representative image (step 712). Then, the current frame number n is substituted into fn, the frame number of recent shot change. If Rcp is smaller than th1, n minus fn is obtained and if the result is greater than or equal to a threshold value th4, the processing for shot change is performed. Otherwise, one is added to the current frame number n and the processing goes back to step 702.

In addition to the above-mentioned methods based on shot, representative image extraction may be achieved by another approach. For example, Japanese Patent Laid-Open No. 7-192003 discloses a technique in which an image of a scene having a caption in a video is extracted as a representative image. Alternatively, an image in which a human being is present or a conversation is being made may be extracted as a representative image. Determination whether a human being is present or not may be made almost automatically by detecting a frame image in which a black area indicating the hair rests over a flesh color indicating the face, by way of example. A scene of conversation may be detected by analyzing a voice signal to obtain a frequency band corresponding to human voice, by way of example. In making a digest of the images thus obtained, the significance of images increases as they approach the interrupted position of the video. In the above description, the extraction is made automatically; but it will be apparent that the extraction may also be made manually. And, if an error is found in the automatic extraction or its result is undesirable, modifications may be made thereto.

Figure 12:
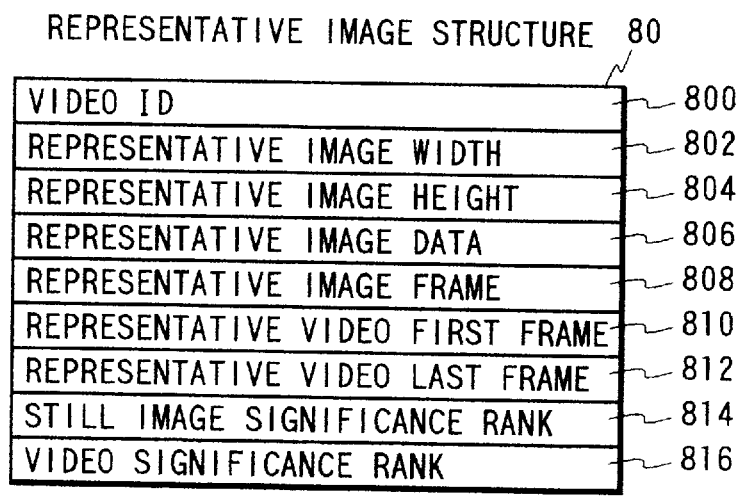
FIG. 12 is an example of the file structure for managing a representative image.

FIG. 12 shows a representative image data structure 80, a file data structure for the representative images obtained by the above-mentioned method. The representative images are of two types; still image and video (moving image). The still image is for list display, while the video image is for video digest. A video ID 800 indicates which video the representative image belongs to. Reference numerals 802 through 808 indicate data necessary when the representative image is an still image; 802 indicates the width, 804 the height, 806 the pixel data, and 808 the frame number in the video. Reference numerals 810 and 812 indicate data necessary when the representative image is a video image; 810 indicates the start frame number in the video while 812 indicates the end frame number. The representative image data structure has two types of rank storage data structures, a still image significance rank 814 and a video significance rank 816. When the representative image is a still image, its significance is written to the still image significance rank 814; when it is a video image, its significance is written to the video significance rank 816.

If the representative image data structure has information about only one of the still and video images, the user can only see one of the still and video representative images. However, it will be apparent that there is no problem in system operation.

Next, the processing by the significance extracting program 128 will be described. A variety of representative images obtained by the representative image extracting program 126 can be ranked according to their significance. For example, in generating a digest, an image in which a caption appears is relatively high in significance. In a news video, connecting portions having captions generates a digest of only headlines. If background music has been recognized and the music sounds like theme music or inspiring music for example or repeats again and again, that portion of the image is a scene of relatively high significance in general. Therefore, the significance can be ranked depending on a type of feature used for the extraction of a particular representative image. However, properly ranking a variety of representative images requires correct understanding of the meaning of each image. Currently, execution of such processing by using the computer is impractical. Therefore, means is provided which presents the extracted images in a list to allow a manager of the images to compare them with each other for ranking them.

Figure 17:
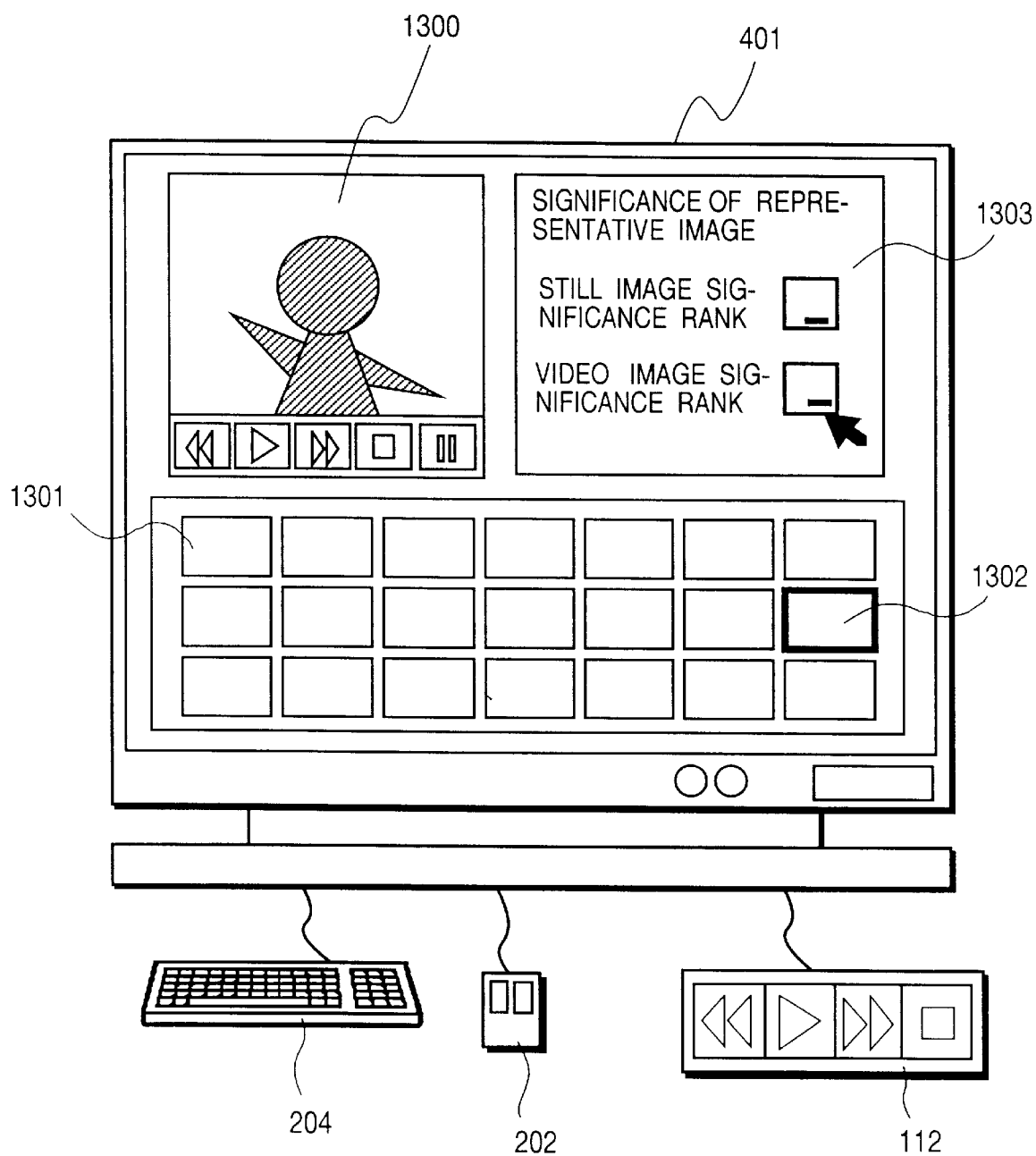
FIG. 17 is a schematic diagram illustrating an example of an input/output display to be used when assigning significance rank.

For example, the extracted representative images are displayed by the significance extracting program 128 onto the output device such as the display in form of icons. Using these icons, the manager of the images ranks the extracted representative images from the side of the video server for example. FIG. 17 shows an example of a significance assigning screen. Reference numeral 1301 indicates an image display area. A representative image of a shot including an image being displayed is highlighted as shown by reference numeral 1302 to distinguish it from others. Reference numeral 1303 indicates an area in which representative image ranks are entered. In this example, the significance of the representative image 1302 is entered from the input device such as a keyboard 204, a mouse 202 or the controller 112 while looking at the display 401. The entered significance rank information is associated with the corresponding representative images to be stored in the representative image library 104 of FIG. 12 in a file format.

Figure 16:
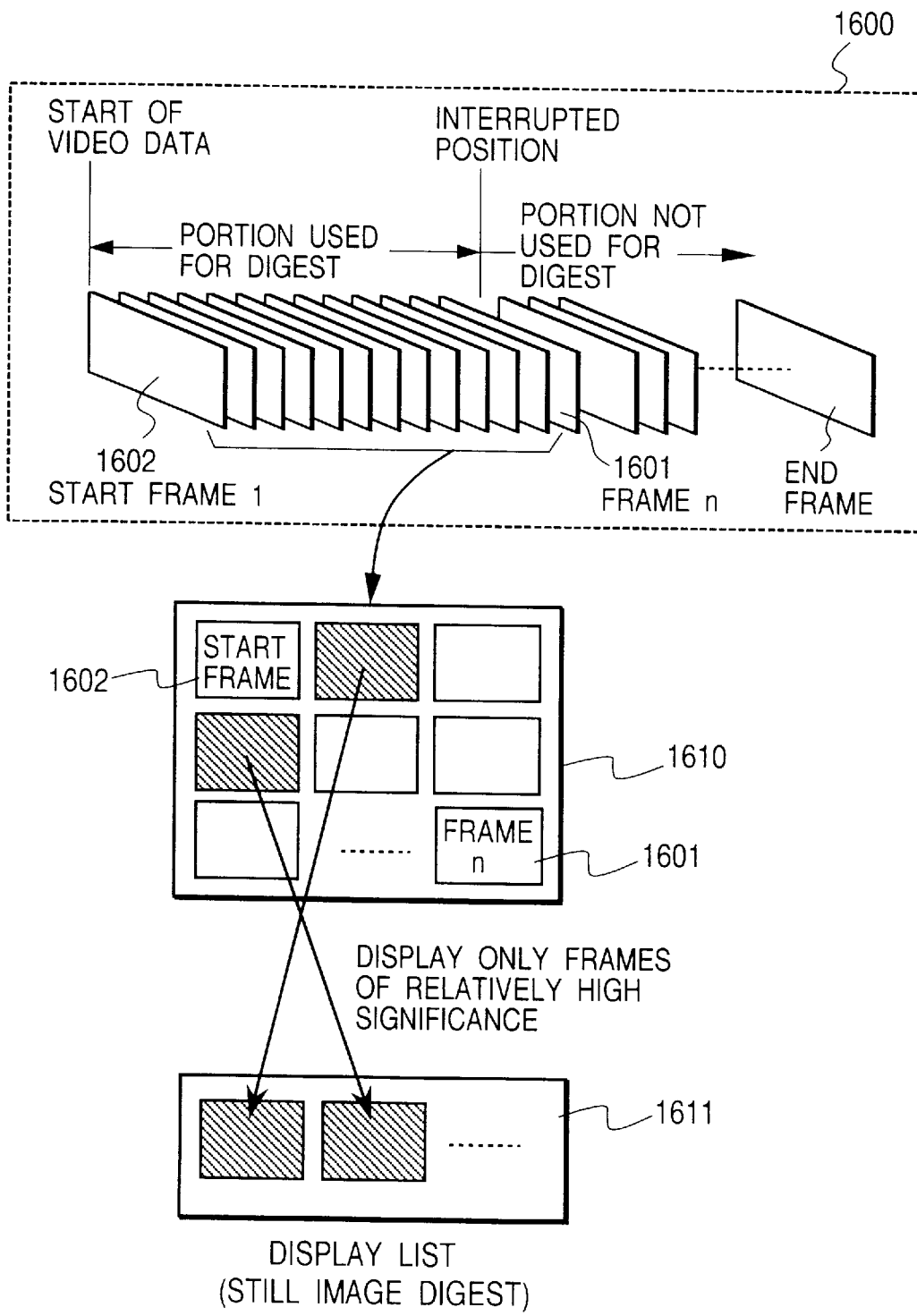
FIG. 16 is a schematic diagram illustrating the outline of generating digest information to be given at resuming viewing.

In what follows, the processing by the digest making program 130 will be described with reference to FIGS. 2, 6 and 16.

Receiving a viewing resumption request from the set top box, the digest making program 130 generates a still image digest a video digest based on a list of representative images. Which of the digests is to be made may be notified from the set top box in advance or set at the time of concluding a VOD contract.

First, the processing by a still image digest making program 130A will be described. If an elapsed time from the interruption of viewing a program is shorter than a time preset by the system, it is regarded that the viewer remembers well the contents of the already viewed portion of the program, so that no digest information is generated. In this case, a digest image is made by the still image digest making program 130A stored in the memory 124. In generation, as shown in FIG. 16, a frame number (for example n (1601)) of the interrupted position is obtained from viewing request information (indicated by the information data structure 20 at modification of FIG. 6). Then, of the representative images (1600) stored in the representative image library 104, representative images associated with the portion ranging from the start (1602) of the video to the interrupted position (1601) on the video are called. This is visually expressed as indicated by reference numeral 1610. If the number of representative images from the start to the interrupted position is so large that it exceeds the number of images which can be displayed on the user's display, only those representative images which are especially significant to the user are listed. Namely, from the representative images 1610, a group of representative images of relatively higher significance indicated by reference numeral 1611 is selected. The significance of each representative image is predetermined by the significance extracting program 128 and is stored, associated with the corresponding representative image, in the representative image library 104. Based on the significance, a list containing only the representative images over a particular rank is created. If the number of representative images over the particular rank is too small, the rank may be lowered until there is a sufficient number of images.

Figure 13:
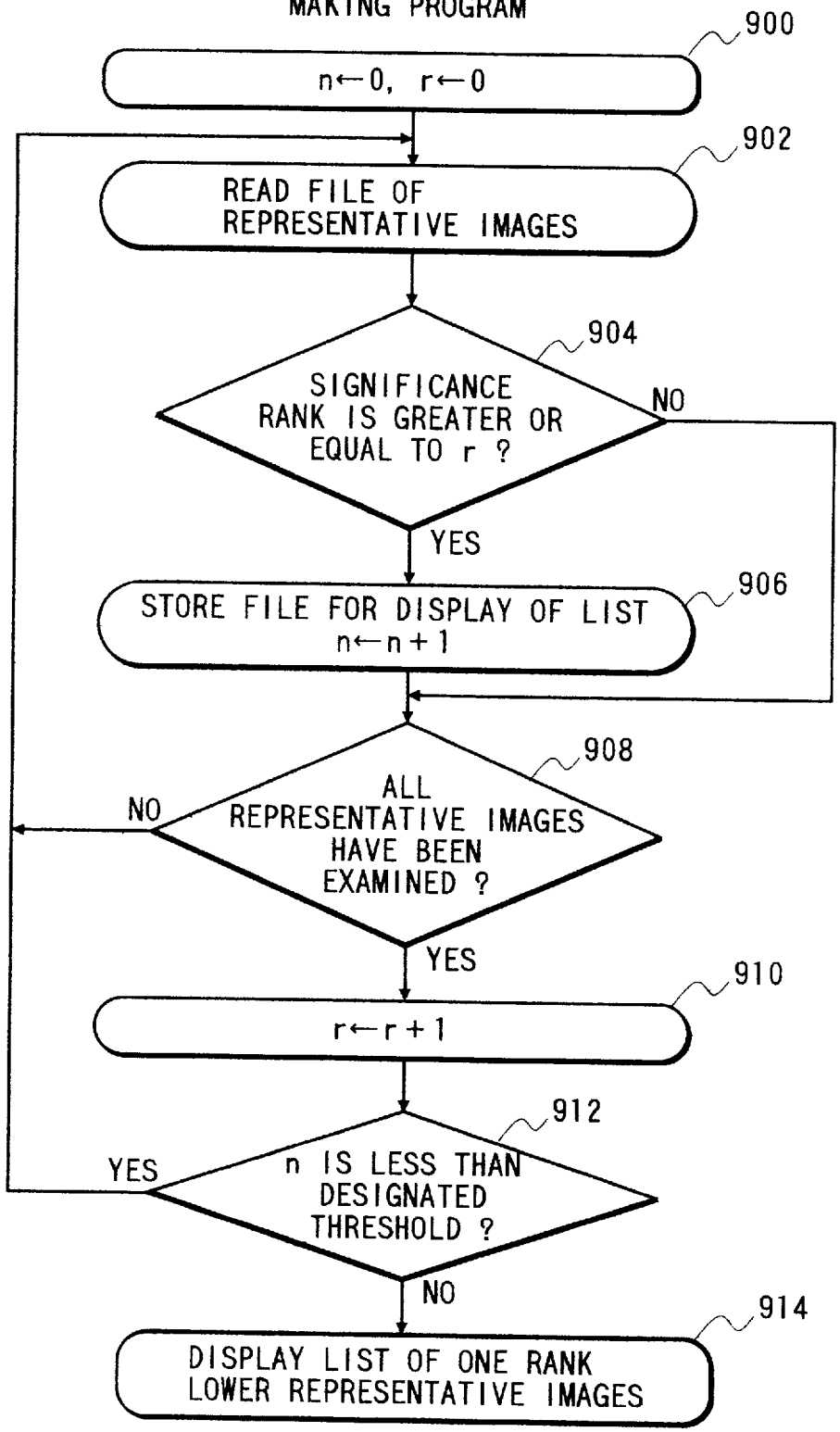
FIG. 13 is a flowchart indicating an example of the method of selecting a representative image to be displayed in a list.

FIG. 13 shows a flowchart indicating the processing by the still image digest making program 130A. In step 900, initialization is performed. That is, n for counting the number of selected representative images and r for selecting representative images over a certain rank are set to zeros. Zero indicates that the rank is highest in significance. As the number gets higher, the rank gets lower. In step 902, one of the representative images is read to check its rank. If the rank is found higher or equal to r, or the value of the rank is smaller than the value of r, the representative image having that rank is stored to be listed, one being added to n (step 906). When all of the representative images have been checked for their ranks (step 908), one is added to r. If n is lower than a designated threshold, the processing goes back to step 902; otherwise, a list of the representative images having a rank lower than the rank in the case of NO of step 912 by one step is displayed (step 914).

Figure 14:
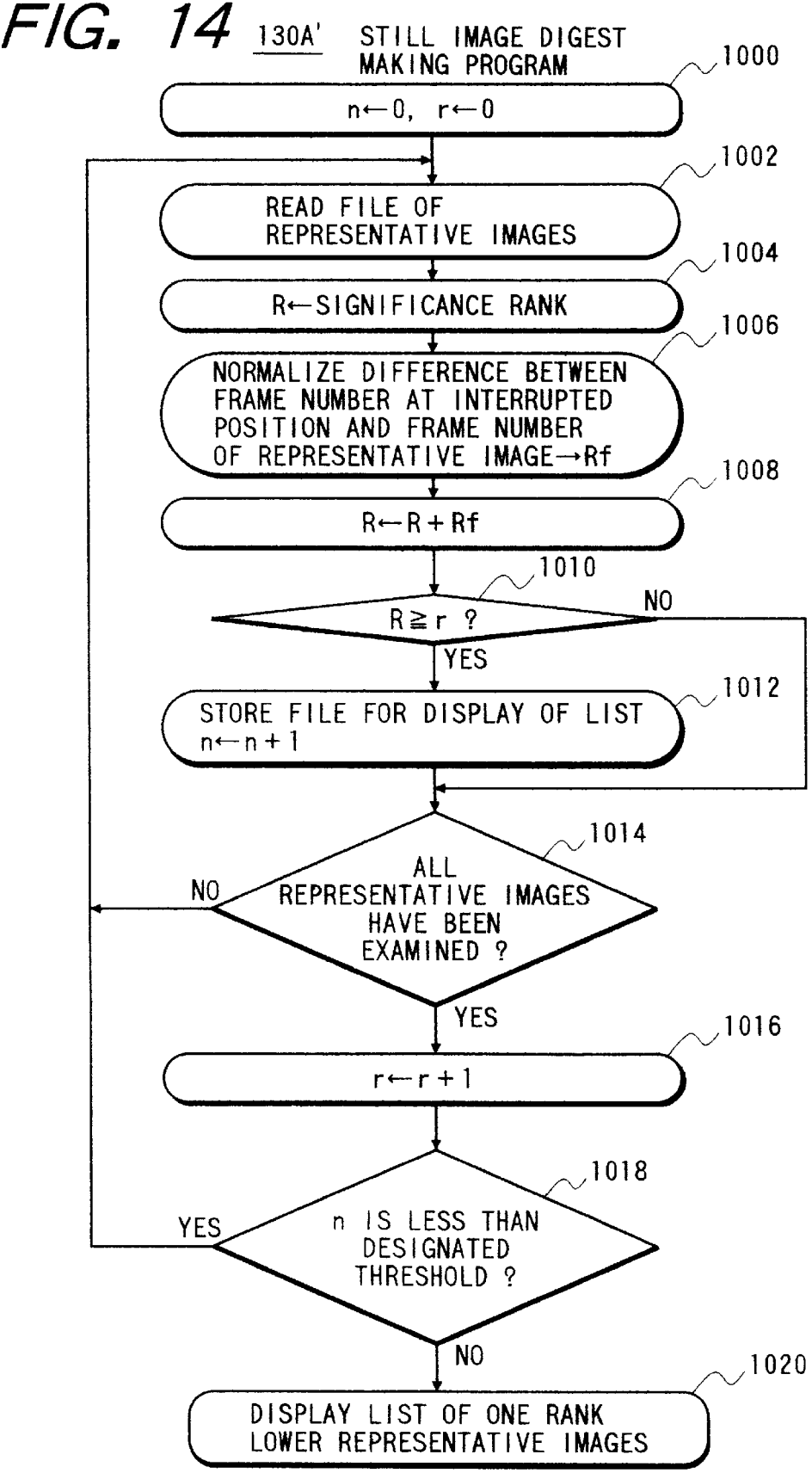
FIG. 14 is a flowchart indicating another example of the method of selecting a representative image to be displayed in a list.

Alternatively, the ranks of the representative images may be dynamically changed according to the images' temporal distances from the interrupted position. For example, the volume of the information about those images nearer the interrupted position may be increased for smooth resuming of playback. This is implemented by a still image digest making program 130A', its processing being flowcharted in FIG. 14. The flow of the processing is basically the same as that of FIG. 13. The difference is steps 1004 through 1010 to which some changes are made. First, in step 1004, a value of significance rank of a representative image is substituted into R. Then, the difference between the frame number of the interrupted position and the frame number of its representative image is normalized to Rf. Because Rf becomes greatest for the start frame of the video, which range the value of Rf is to be normalized in is determined by how much the rank is to be lowered at the point where Rf is greatest (step 1006). If the value of R+Rf is smaller than the value of r, or the rank is relatively higher, the processing of step 1012 is performed (steps 1008 and 1010).

Further, in the above description, all the representative images from the start of the video are subject to selection. It will be apparent that only the representative images for a certain period of time before the interrupted position may be selected. The list thus created is sent to the set top box 108 to be presented to the viewer on the display 110. Selecting one of the icons in the list, the viewer can resume playback starting from the scene corresponding to the selected icon.

Figure 15:
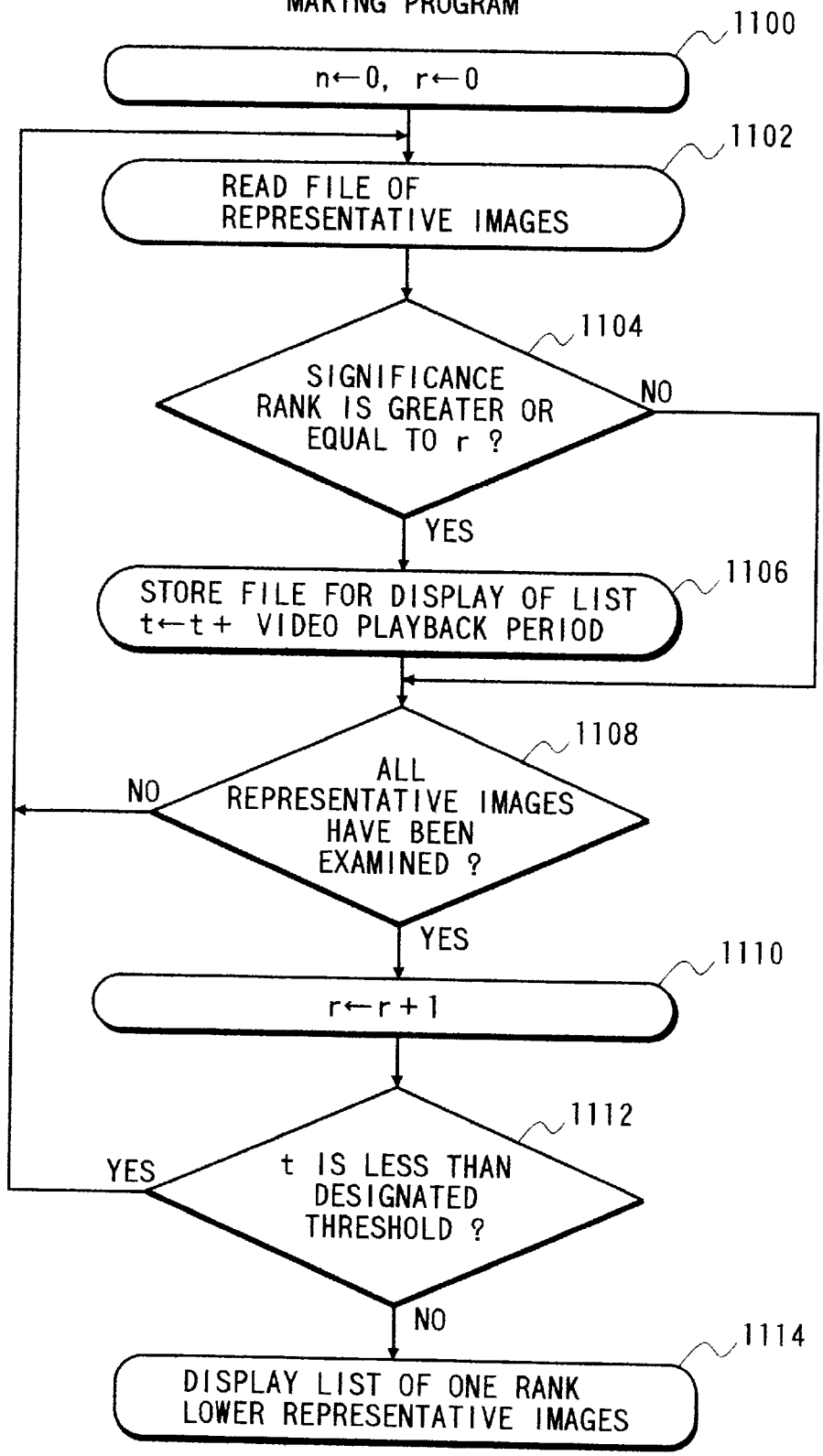
FIG. 15 is a flowchart indicating an example of the method of selecting a representative image to be used in a video digest.

In the above description, the processing for making the list of the representative images of still pictures. A video digest can be implemented by sequentially playbacking a video image that ranges over about several seconds before and after each of the representative images. FIG. 15 shows a flowchart indicating the processing by a video digest making program 130B. This processing is basically the same as that of FIG. 13. The difference lies in that, instead of the number of representative images n, a video playback period t is counted (step 1106). Until the total of the video playback periods exceeds the threshold of a video digest display time preset in the system, representative images are selected by lowering their ranks (step 1112). The threshold time may be appropriately set in a range that does not make the viewer boring, the range not exceeding the viewing time from the start of the program up to the interruption.

In the video digest, voice is also playbacked along with video images, so that simply determining a video period to be playbacked only by time sometimes causes a disadvantage in viewing the video because the sound starts or ends halfway in playback. To solve this problem, video period is first determined and then a sound volume level around the period is checked to adjust the period such that the period starts with a soundless portion and ends with another soundless portion as long as possible. The data about the adjusted period may be stored in the representative image library beforehand, the data being associated with each of the representative images in the library. To be generated as the video digest is a list of the data determined for each of the representative images. Based on this list, the video control program 132 sends the video image stored in the video library 102 to the set top box 108. In addition, immediately following the presentation of the video list to the user, the portion of video starting from the interrupted position may be playbacked. For smooth resumption of the viewing by the user, the resuming position may be set somewhat before of the interrupted position. If such setting has been made, playback is resumed starting from the shot change before the interrupted position. Also, without waiting for the end of digest display, the digest display may be discontinued as instructed by the user via the controller 132, resuming the playback starting from the interrupted position. A same portion of a video program may be appropriate as a representative image for the display of a still image list, while it is inappropriate as a representative image for the display of a video digest. Therefore, to build a system that can present both the still image list and video digest as digest images, it is necessary to determine the significance ranks for each of the representative images for each of the list and digest beforehand.

Figure 9:
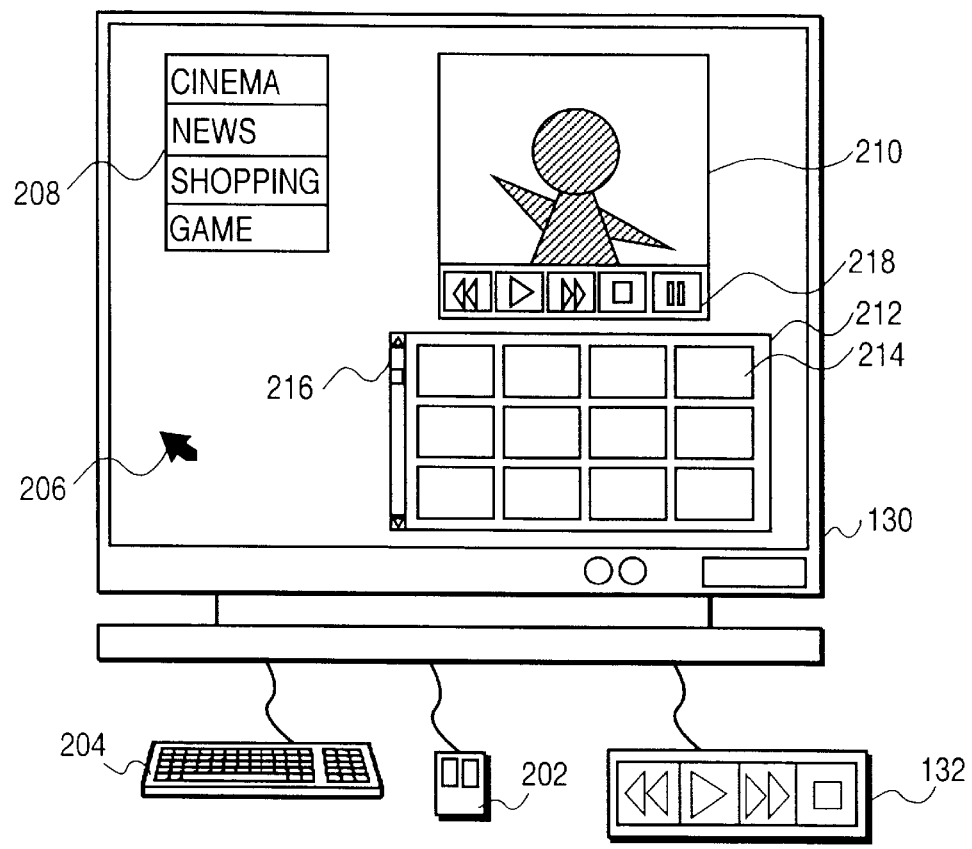
FIG. 9 is a schematic diagram illustrating an example of the screen layout of the set top box as used in the present invention.

In what follows, some examples of utility forms of the present invention will be described. FIG. 9 shows an example of the display screen 110 of the set top box 108. The user can use the controller 112, the mouse 202, the keyboard 204 or the like to instruct the video server 100. When using the mouse 202, a cursor 206 moves on the screen in synchronization with a movement of the mouse. Reference numeral 208 indicates a menu for video selection and device setting. Reference numeral 210 indicates a monitor area for video viewing. Reference numeral 218 is a control panel area arranged with buttons for playback, stop, and other operations by selection of which the user changes video playback states. Reference numeral 212 indicates an area in which a list of representative images is shown. In practice, this area is arranged with icons 214 for the representative images. If there are too many representative images to be contained in this area, the display can be scrolled for showing excess images. Reference numeral 216 indicates a scroll bar for the scroll operation.

When the user wants to view a video program, the user selects the corresponding title from among titles displayed in the menu 208 by operating the mouse or controller. This menu is hierarchical, starting with major fields such as cinema and news. When a major field is selected, the titles of minor groups contained in the selected major field are displayed. When the titles of video programs have been displayed finally, selecting the desired title determines the video program to be playbacked. Alternatively, after some fields have been limited by menu selection, icons representative of the video programs contained in each field can be displayed in the area 212 for selection of video titles in an object approach rather than a text approach. A desired video program is selected by pointing the corresponding icon. When the video program to be playbacked has been thus determined, it is playbacked on the monitor area 210. The playback can be performed not only on the monitor area but also on the entire display. Before starting the playback, a list of the representative images of the selected video program can be displayed in the area 212. If the user has not definitely determined a video program to be viewed, the user can use this list as the table of contents to comprehend the outlines of video programs. This allows the user to promptly confirm whether certain video programs are worth viewing or not. Also, the user can confirm the video digest on the monitor area. In a paid video on demand service, it can be arranged such that viewing of the list display or the video digest is not charged, thereby exempting the user from being charged of the subsidiary viewing that only supports the main viewing of a video program.

Figure 10:
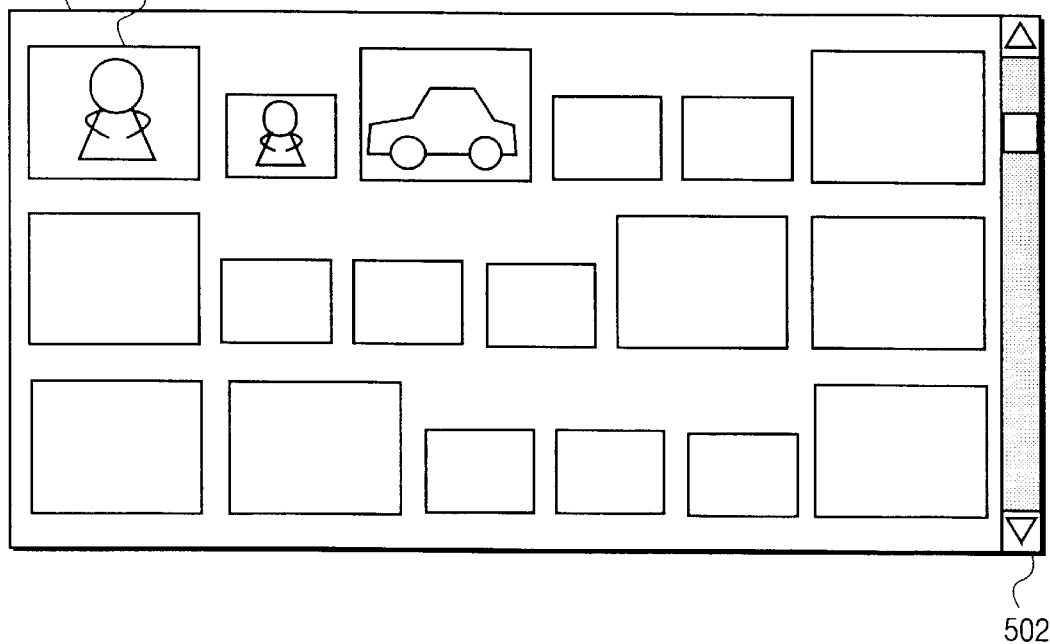
FIG. 10 is a schematic diagram illustrating an example of the method of displaying a list of representative images.

If the viewing has been interrupted by the user and the set top box 108 has been turned off, the set top box 108 stores information about the interrupted position, so that, when the set top box is restarted, the set top box asks the user if the user wants to resume the playback of the interrupted video program. If the user wants the resumption, the set top box displays the list of representative images up to the Interrupted position (the still image digest) or the video digest and resumes the playback starting from the interrupted position. In the case of the still image digest for example, as shown in FIG. 10, the representative images are displayed such that images of higher significance ranks are shown larger than those of lower ranks for example, thus visually featuring the images of interest for ease of their selection. For this purpose, the image at a shot change is displayed larger than other images for example.

If a plurality of users use one after another the same set top box to view video programs, the data about interrupted positions must be prepared for all the users. Consequently, the set top box must be arranged such that it cannot be used unless the authentication of each user is first entered by providing generally the same log-in means as that often provided for the operation system (OS) of a host computer or a workstation. However, in the case of the set top box, personal security is not important in many cases, so that the password specification may be omitted to reduce the operator load. Further, logging-in may be made by selecting characters or pictures representative of the users registered beforehand. These arrangements allows the set top box to know who is using it, so that it promptly reads the interrupted position data for the user, resuming the playback for that user. The data about who is using the set top box may also be sent to the video server. This allows the video server side to estimate liking of particular users from the frequency of viewing and other information, sending best new arrivals information and the like to each of the users separately, for example.

It will be apparent to those skilled in the art that the application of the present invention is not limited to special system forms such as video on demand. Rather, the present invention can be applied to personal use, standalone devices such as video tape recorders, televisions, and personal computers. Namely, as far as the embodiments of the present invention have the video playback means such as mentioned above and the video storage means such as mentioned above for example, means may be incorporated that stores the position at which the user has interrupted viewing of a video program, extracts images partially representative of the portion so far viewed, and dynamically generates the digest information such as a list display with reduced icons or a video digest, these capabilities being operated by software.

The invention has been described with reference to the preferred and alternate embodiments. Obviously, modifications and alterations will occur to those of ordinary skill in the art upon reading and understanding the present invention. It is intended that the invention be construed as including all such modifications and alterations in so far they come within the scope of the appended claims or the equivalent thereof.

What is claimed is:

1. A video playback assisting method in a video playback system having a video server for supplying a plurality of video programs and a terminal device operable by a user, wherein said terminal device has an input device operable by said user and a display device for displaying one of said plurality of video programs supplied from said video server, said method comprising the steps of:

supplying one of said plurality of video programs from said video server to said terminal device, in response to a video playback request which is entered from said input device and requests playback of said video program, and displaying said video program on said display device;

interrupting said supplying of said video program, in response to a stop request entered from said input device during said supplying of said video program;

supplying a digest image of said video program interrupted, from said video server to said terminal device, in response to a subsequent video playback request which is entered by said input device after said interrupting and requests playback of a same video program as said video program interrupted, said digest image indicating an outline of a portion of said video program interrupted, preceding to an interrupted position at which said video program was interrupted; and supplying a portion of said video program interrupted as succeeding to said interrupted position, from said video server to said terminal device, after supplying of said digest image.

2. A video playback assisting method according to claim 1, further comprising a step of:

storing information for identifying said interrupted video program and information for identifying said interrupted position;

wherein said supplying of said digest image comprises the steps of;

determining whether a video program requested by said subsequent video playback request matches said video program interrupted, based on the stored information for identifying, in response to said subsequent video playback request, and supplying said digest image to said terminal device, if said video program requested by said subsequent video playback request has been found matching said video program interrupted.

3. A video playback assisting method according to claim 2, wherein said information for identifying said interrupted video program and said information for identifying said interrupted position are stored in said terminal device;

wherein said determining step is executed by said terminal device, wherein said supplying of said digest image further comprises a step of supplying from said terminal device to said video server, a video playback request for reproducing said video program interrupted from said interrupted position, if said video program requested by said subsequent video playback request has been found matching said video program interrupted, by said determining step.

4. A video playback assisting method according to claim 1, wherein said digest image comprises an approximately constant number of images independent of said interrupted position.

5. A video playback assisting method in a video playback system having a storage device for storing a plurality of video programs, an input device operable by a user, and a display device for displaying one of said plurality of video programs for said user, said method comprising the steps of:

displaying one of said plurality video programs on said display device, in response to a video playback request entered from said input device and requesting said video program;

interrupting said displaying of said video program, in response to a stop request entered from said input device during said displaying of said video program;

generating a digest image of said video program interrupted, in response to a subsequent video playback request which is entered from said input device after said interrupting and requests playback of a same video program as said video program interrupted, said digest image indicating an outline of a portion of said video program interrupted, preceding to an interrupted position at which said video program interrupted was interrupted;

displaying said generated digest image on said display device; and displaying a portion of said video program interrupted, succeeding to said interrupted position as stored in said storage device, onto said display device, after said displaying of said generated digest image.

6. A video playback assisting method according to claim 5, wherein said displaying of said digest image comprises a step of generating said digest image from said video program interrupted.

7. A video playback assisting method according to claim 6, further comprising the steps of:

generating a plurality of groups of representative images, each group corresponding to one of said plurality of video programs stored in said storage device, representative images of each group comprising representative images of one of said plurality of video programs corresponding to said each group; and storing said plurality of generated groups of representative images into said storage device;

wherein said generating step of said digest image comprises a step of generating said digest image from one group of representative images stored in said storage devices corresponding to said video program interrupted, among said plurality of groups of representative images.

8. A video playback assisting method according to claim 5, further comprising a step of:

storing information for identifying said interrupted video program and information for identifying said interrupted position, in response to said stop request;

wherein said generating step of said digest image comprises the steps of;

determining whether a video program requested by said subsequent video playback request matches said video program interrupted, based on said two pieces of stored information, in response to said subsequent video playback request, and generating said digest image, if said video program requested by said subsequent video playback request has been found matching said video program interrupted.

9. A video playback assisting method in a video playback system having a storage device for storing a plurality of video programs and a plurality of groups of representative images, each group corresponding to one of said plurality of video programs, representative images of each group being representative of a corresponding one of said plurality of video programs, an input device operable by a user, and a display device for displaying said video programs and said representative images for said user, said method comprising the steps of:

displaying one of said plurality of video programs requested by a video playback request onto said display device, in response to said video playback request entered from said input device;

interrupting said displaying of said video program, in response to a stop request entered from said input device during said displaying of said video program;

generating a digest image of said video program interrupted, in response to a subsequent video playback request which is entered from said input device and requests playback of a same video program as said video program interrupted, said digest image indicating an outline of a portion of said video program interrupted, preceding to an interrupted position at which said video program was interrupted, said digest image being generated from one group of representative images stored in said storage device corresponding to said video program interrupted among said plurality of groups of representative images;

displaying said generated digest image on said display device; and displaying a portion of said video program interrupted succeeding to said interrupted position as stored in said storage device, onto said display device, after said displaying of said generated digest image.

10. A video playback assisting method according to claim 9, further comprising a step of:

storing information for identifying said video program interrupted and information for identifying said interrupted position, in response to said stop request;

wherein said generating step of said digest image comprises the steps of, determining whether a video program requested by said subsequent video playback request matches said video program interrupted, based on said two pieces of stored information, in response to said subsequent video playback request, and generating said digest image if said video program requested by said subsequent video playback request has been found matching said video program interrupted.

11. A video playback assisting method according to claim 9, wherein said digest image comprises a plurality of images to be displayed as a motion picture.

12. A video playback assisting method according to claim 11, further comprising a step of:

displaying a portion of said video program interrupted immediately preceding to said interrupted position, after said displaying of said digest image and before said displaying of said succeeding portion of said video program interrupted.

13. A video playback assisting method according to claim 12, wherein the generating step of said digest image comprises a step of generating a digest image of a portion of said video program interrupted further preceding to said portion immediately preceding to said interrupted position, from a plurality of representative images belonging to said further preceding portion, within an entire portion of said video program interrupted, preceding to said interrupted position.

14. A video playback assisting method according to claim 9, wherein said digest image comprises a plurality of images arranged to be displayed as a still picture within at least one display screen.

15. A video playback assisting method according to claim 9, wherein said generating step of said digest image comprises the steps of:

selecting part of said plurality of representative images corresponding to said video program interrupted, preceding to said interrupted position; and generating said digest images from said selected part of said plurality of representative images.

16. A video playback assisting method according to claim 15, wherein said storage device further holds significance information for each of said plurality of representative images corresponding to each video program;

wherein said selecting step of said part of said plurality of representative images comprises a step of selecting said part of said plurality of representative images, based on said significance information stored in said storage device for each of said plurality of representative images corresponding to said video program interrupted, preceding to said interrupted position.

17. A video playback assisting method according to claim 15, wherein said digest image comprises a plurality of images to be displayed as a motion picture;

wherein said selecting step of said part of said plurality of representative images comprises a step of selecting said part of said plurality of representative images, preceding to said interrupted position, based on a predetermined threshold associated with a display time of said generated digest image.

18. A video playback assisting method according to claim 17, wherein said storage device further holds significance information for each of said plurality of representative images corresponding to each video program;

wherein said selecting step of said part of said plurality of representative images comprises a step of selecting said part of said plurality of representative images, based on said significance information stored in said storage device for each of said plurality of representative images corresponding to said video program interrupted, preceding to said interrupted position and on a predetermined threshold associated with a display time of said generated digest image.

19. A video playback assisting method according to claim 15, wherein said digest image comprises a plurality of images arranged so as to be displayed as a still picture within at least one display screen;

wherein said selecting step of said part of said plurality of representative images comprises a step of selecting said part of said portion of said plurality of representative images, based on a predetermined threshold associated with a total number of images to be displayed as a still picture in at least one display screen.

20. A video playback assisting method according to claim 19,
wherein said storage device further holds significance information for each of said plurality of representative images corresponding to each video program;
wherein said selecting step of said part of said plurality of representative images comprises a step of selecting said part of said plurality of representative images, based on said significance information stored in said storage device for each of said plurality of representative images, preceding to said interrupted position and said predetermined threshold associated with said total number of images to be displayed as a still image in at least one display screen.

21. A video playback system, comprising:
a storage device for storing a plurality of video programs;
an input device operable by a user;
a display device for displaying a video program for said user; and
a video control device, connected to said storage device, said input device, and said display device, for controlling supply of said plurality of video programs from said storage device to said display device;
wherein said video control device has;
a first computer, and
a first memory for storing a first computer program to be executed by said first computer;
wherein said first computer program is programmed so as to execute the steps of;
supplying one of said plurality of video programs from said storage device to said display device, in response to a video playback which is entered from said input device and requests playback of said video program, and displaying said video program on said display device;
interrupting said supplying of said video program, in response to a stop request entered from said input device during said supplying of said video program;
generating a digest image of said video program interrupted, in response to a subsequent video playback request entered by said input device after said interrupting and requesting playback of a same video program as said video program interrupted, said digest image indicating an outline of a portion of said video program interrupted, preceding to an interrupted position at which said video program was interrupted;
supplying said generated digest image of said video program interrupted, from said video server to said display device; and
supplying a portion of said video program interrupted succeeding to said interrupted position, from said storage device to said display device, after supplying of said digest image.

22. A video playback system according to claim 21, further comprising:
a terminal control device connected to said input device and said video control device for control transfer of a request entered from said input device to said video control device;
wherein said terminal control device has;
a second computer, and
a second memory for storing a second computer program to be executed by said second computer;
wherein said second computer program is programmed so as to execute the steps of;
storing information for identifying said video program interrupted and information for identifying said interrupted position, in response to said stop request,
determining whether a video program requested by a subsequent video playback request matches said video program interrupted, based on said stored information for identifying said video program interrupted, in response to entering of said subsequent video playback request after said interrupting from said input device, and
transmitting to said video control device, a video playback request for reproducing said video program interrupted from said interrupted position, if said video program requested by said subsequent video playback request has been found matching said interrupted video program interrupted;
wherein said first computer program is further programmed so as to execute said supplying step of said digest image, in response to said video playback request transferred from said terminal control device.

23. A video playback system according to claim 22, wherein said video control device and said storage device are connected to said terminal control device and said display device via a network.

24. A video server for a video playback system which includes a display device for displaying a video program supplied from said video server, an input device operable by a user for inputting a request to be supplied to said video server, comprising:
a storage device for storing a plurality of video programs; and
a video control device connected to said storage device for controlling supply of said plurality of video programs from said storage device to said display device;
wherein said video control device has;
a computer, and
a memory for storing a computer program to be executed by said computer;
wherein said computer program is programmed so as to execute the steps of;
supplying one of said plurality of video programs from said storage device to said display device, in response to a video playback request which is entered from said input device and requests playback of said video program, and displaying said video program on said display device;
interrupting said supplying of said video program, in response to a stop request entered from said input device during said supplying of said video program;
supplying a digest image of said video program interrupted, from said video server to said display device, in response to a subsequent video playback request which is entered by said input device after said interrupting and requests playback of a same video program as said video program interrupted, said digest image indicating an outline of a portion of said video program interrupted, preceding to an interrupted position at which said video program was interrupted; and
supplying a portion of said video program interrupted succeeding to said interrupted position, from said storage device to said display device, after supplying of said digest image.

25. A terminal device for a video playback system which includes a video server for supplying a plurality of video programs to said terminal device, comprising:

a display device for displaying a video program supplied from said video server;

an input device operable by a user for inputting a request to be supplied to said video server;

a terminal control device connected to said input device and said video server for controlling transfer of a request entered from said input device to said video server;

wherein said terminal control device has;
a computer, and
a memory for storing a computer program to be executed by said computer;

wherein said computer program is programmed so as to execute the steps of;

supplying said video server with a video playback request entered from said input device;

supplying said video server with a stop request entered from said input to interrupt a video program requested by said video playback request, in response to inputting of said stop request from said input device during said requested video program is being supplied from said video server to said display device;

storing information for identifying said video program interrupted and information for identifying an interrupted position at which said video program interrupted has been stopped, in response to said stop request, determining whether a video program requested by a subsequent video playback request matches said video program interrupted, based on said stored information for identifying said video program interrupted, in response to entering of said subsequent video playback request after said interrupting from said input device, and transmitting to said video server, a video playback request for reproducing said video program interrupted from said interrupted position, if said video program requested by said subsequent video playback request has been found matching said video program interrupted.

* * * * *